F. O. BIBLE.
ROTARY ENGINE.
APPLICATION FILED NOV. 25, 1907.

934,384.

Patented Sept. 14, 1909.
2 SHEETS—SHEET 1.

WITNESSES

INVENTOR
FRANK O. BIBLE,
BY Munn & Co.
ATTORNEYS

F. O. BIBLE.
ROTARY ENGINE.
APPLICATION FILED NOV. 25, 1907.
934,384.
Patented Sept. 14, 1909.
2 SHEETS—SHEET 2.
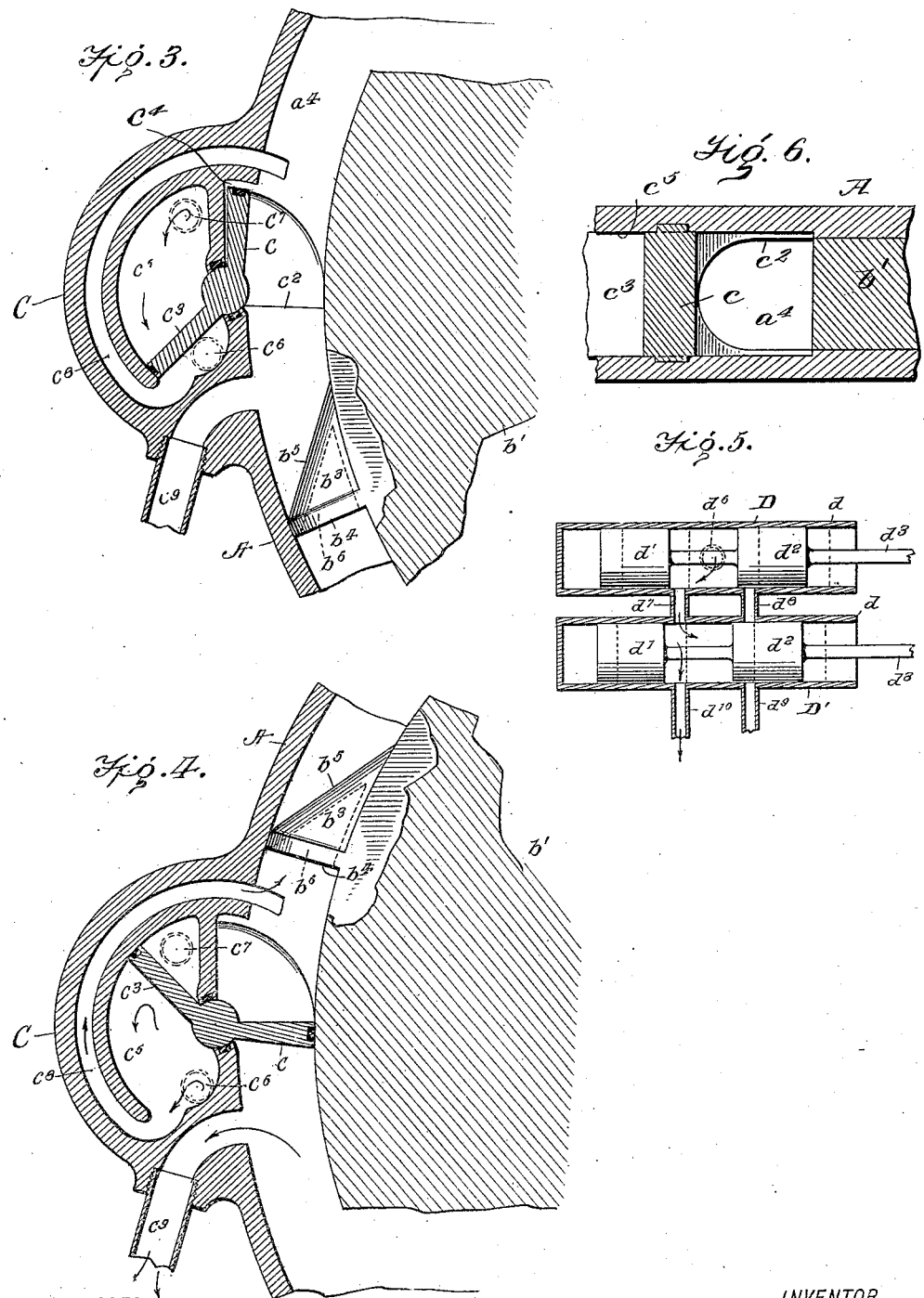
WITNESSES
INVENTOR
FRANK O. BIBLE,
BY
ATTORNEYS

UNITED STATES PATENT OFFICE.

FRANK OLIVER BIBLE, OF WILKINSBURG, PENNSYLVANIA, ASSIGNOR OF ONE-FIFTH TO JOHN H. DASH, OF PITTSBURG, PENNSYLVANIA.

ROTARY ENGINE.

934,384.

Specification of Letters Patent. Patented Sept. 14, 1909.

Application filed November 25, 1907. Serial No. 403,688.

*To all whom it may concern:*

Be it known that I, FRANK O. BIBLE, a citizen of the United States, and a resident of Wilkinsburg, in the county of Allegheny and State of Pennsylvania, have made certain new and useful Improvements in Rotary Engines, of which the following is a specification.

My invention is an improvement in rotary engines and consists in certain novel constructions and combinations of parts hereinafter described and claimed.

Figure 1:
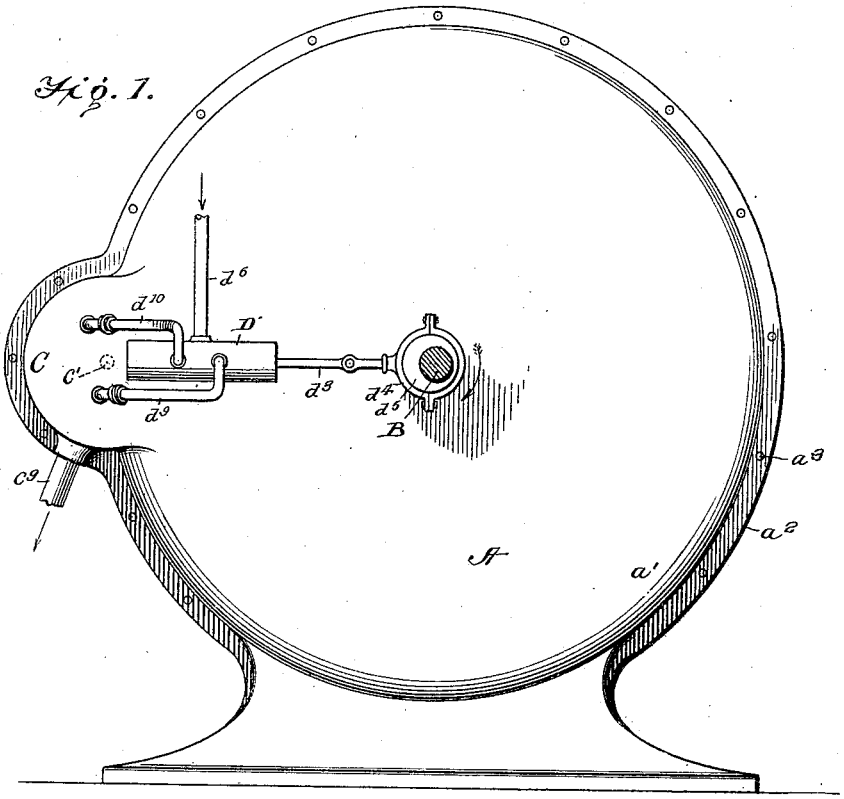
Figure 2:
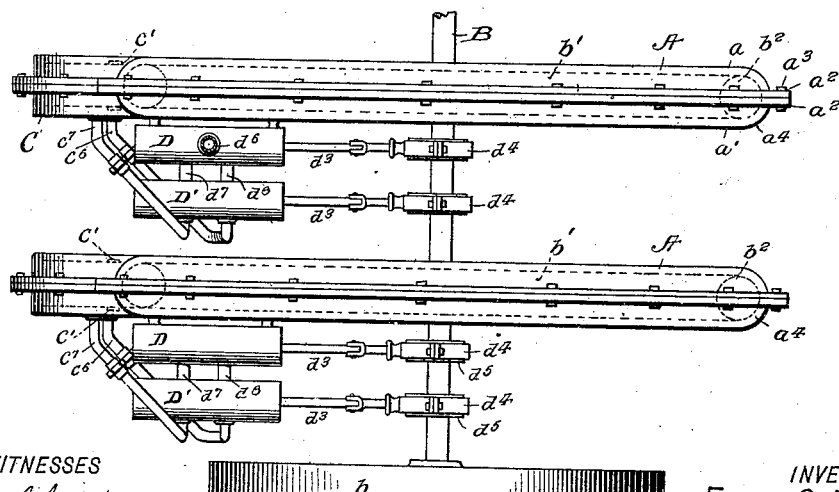

Referring to the drawings forming a part hereof—Figure 1 is a side view of one of the cylinders of my improved engine, Fig. 2 is a plan view showing two of the cylinders, Fig. 3 is an enlarged partial transverse section through one of the cylinders showing the gate in one position, Fig. 4 is a similar view showing the gate in another position, Fig. 5 is a horizontal section through the valve mechanism, and Fig. 6 is a partial transverse section on the line of the gate.

The present embodiment of my invention comprises a plurality of cylindrical casings A, each casing consisting of two similar sections $a$, $a'$, each provided with flanges $a^2$, and the sections are connected together by rivets or bolts $a^3$ traversing the flanges. The casings are arranged parallel with each other, and a shaft B is journaled in the casings, one of the ends of the shaft being provided with a fly wheel $b$ which may be connected by a belt with the machinery to be operated in the usual manner. Secured to the shaft within each of the casings, is a disk $b'$, whose periphery is concave as at $b^2$, the said periphery being spaced apart from the edge of the casing, which is also concave as at $a^4$, to form an annular passage in which the motive fluid operates.

A vane $b^3$ having one of its faces radial to the disk, as at $b^4$, and provided with a depression $b^6$, and the other inclined as at $b^5$, is provided on the periphery of the wheel, and the motive fluid impinges against the radial face of the vane to rotate the disk.

A steam chest C is arranged on the edge of the casing at one side thereof, and a gate $c$ is provided with trunnions $c'$, which are journaled in the wall of the casing between the steam chest and the annular passage, the gate being of slightly greater diameter than the passage and adapted to close the same when the gate is open. The wall of the casing is slightly enlarged adjacent to the gate, and is provided with a ledge $c^2$, against which the gate rests when fully open. A wing $c^3$ is connected with the gate, the said wing being arranged at an angle to the gate as shown in Fig. 3, the said wing being arranged to swing the gate in a manner to be presently described. The wall of the casing is cut away as at $c^4$ to form a recess for receiving the gate when the said gate is opened, and a passage $c^5$ is provided in the steam chest, within which the wing $c^3$ swings, the said wing extending entirely across the passage so as to close the same.

The motive fluid is admitted to one side of the wing through a port $c^6$, to swing the gate into closed position, and through a port $c^7$ to open the gate by valve mechanism to be presently described, and a passage $c^8$ leads from the port $c^6$ to the annular passage. The casing is also provided with an exhaust $c^9$ on the opposite side of the gate from the entrance of the passage $c^8$.

It will be evident from the description, that when motive fluid is admitted through the passage $c^6$, the fluid impinging against the wing will swing the gate into the closed position shown in Fig. 4, the motive fluid passing onward through the passage $c^8$ into the annular passage to operate on the vane whereby to rotate the disk. When the vane reaches the position shown in Fig. 3, motive fluid is admitted through the passage $c^7$ to the opposite side of the wing, thus moving the wing to swing the gate into the position shown in Fig. 3, leaving the annular passage clear for the passage of the vane. As soon as the vane passes the opening of the exhaust port, the motive fluid exhausts, and as soon as the vane passes the entrance opening of the passage $c^8$, the motive fluid is admitted through the port $c^6$ to close the gate.

Two valves D and D', are provided for admitting the motive fluid to the annular passage and for opening and closing the gate, each of said valves comprising a cylinder $d$ in which operates a pair of pistons $d'$, $d^2$, connected together and spaced apart from each other, by a piston rod $d^3$, which is connected with a strap $d^4$, encircling an eccentric $d^5$ secured to the shaft B. The motive fluid is admitted to the cylinder D by means of a pipe $d^6$, and the cylinder D is connected by pipes $d^7$, $d^8$ with the cylinder D'. From the cylinder D', pipes $d^9$, $d^{10}$ lead to the ports $c^6$, $c^7$, respectively. When the double piston in the cylinder D is in the position shown in Fig. 5, the motive fluid passes through the cylinder D' to the port $c^7$, swinging the gate into open position, and entering the annular passage to act on the propeller.

When the double piston in the cylinder D is in the position shown in dotted lines in Fig. 5, and the piston in the cylinder D' is also in the position shown in dotted lines, the motive fluid is admitted to the port $c^6$ to open the gate. By adjusting the pistons with respect to each other, the opening of the gate may be adjusted within narrow limits, to shut off the steam at an early time, in order to utilize the expansive force of the steam, while retaining the gate in closed position until the propeller vane is near the exhaust passage.

As many cylinders may be used as desired, and the motive fluid admission is so arranged in the respective cylinders that the motive fluid is admitted in sequence, whereby to provide for a regular series of impulsive efforts.

It will be evident from the description, that all strain on the hinge of the gate is avoided, by the provision of the ledge against which the gate rests when open, and by the provision of the opening for receiving the same when closed.

I claim—

A rotary engine comprising a cylindrical casing, having at one side thereof a steam chest integral with the casing, a shaft journaled in the casing and concentric therewith, a disk secured to the shaft and of lesser diameter than the casing whereby to form an annular passage between the periphery of the disk and the inner wall of the casing, a propeller blade on the disk, said blade being at one end of a cross section equal to the cross section of the annular passage whereby to close the same and merging at the other end into the peripheral surface of the disk, a gate hinged within the steam chest and provided with a wing for closing the passage, said chest having an annular port on each side of the ring for opening and closing the gate, and a passage leading from the port on one side of the gate to the annular passage, and being provided with an exhaust on the opposite side of the gate from the inlet, said annular passage having a shoulder upon which the wing rests when in closing position.

FRANK OLIVER BIBLE.

Witnesses:
 JOHN H. DASH.
 W. A. GILLILAND.